(12) United States Patent
Tsuiki

(10) Patent No.: US 9,325,412 B2
(45) Date of Patent: Apr. 26, 2016

(54) TRANSCEIVER SYSTEM, TRANSMISSION DEVICE, RECEPTION DEVICE, AND CONTROL METHOD OF TRANSCEIVER SYSTEM

(71) Applicant: FUJITSU LIMITED, Kawasaki-shi, Kanagawa (JP)

(72) Inventor: Jun Tsuiki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/187,375

(22) Filed: Feb. 24, 2014

(65) Prior Publication Data

US 2014/0286634 A1  Sep. 25, 2014

(30) Foreign Application Priority Data

Mar. 19, 2013  (JP) .................................. 2013-057009

(51) Int. Cl.
*H04B 10/032*  (2013.01)
*H04J 14/02*  (2006.01)

(52) U.S. Cl.
CPC .......... *H04B 10/032* (2013.01); *H04J 14/0227* (2013.01)

(58) Field of Classification Search
CPC ........................... H04J 14/0227; H04B 10/032
See application file for complete search history.

(56) References Cited

U.S. PATENT DOCUMENTS

| | | | |
|---|---|---|---|
| 7,499,647 B2 * | 3/2009 | Way et al. ........................ | 398/3 |
| 2003/0095303 A1 | 5/2003 | Cunningham et al. | |
| 2007/0233821 A1 | 10/2007 | Sullivan et al. | |
| 2009/0196598 A1 | 8/2009 | Duan et al. | |
| 2010/0246389 A1 | 9/2010 | Toyoda et al. | |
| 2011/0008049 A1 * | 1/2011 | Tanonaka et al. ................ | 398/79 |
| 2011/0138096 A1 | 6/2011 | Radulescu et al. | |
| 2013/0054884 A1 | 2/2013 | Gupta et al. | |

FOREIGN PATENT DOCUMENTS

CN   101212254 A   7/2008
EP   1879307 A1   1/2008

(Continued)

OTHER PUBLICATIONS

Extended European Search Report dated Jul. 3, 2614 for corresponding European Patent Application No. 14154900 6; 7 pages.

(Continued)

*Primary Examiner* — Ken N Vanderpuye
*Assistant Examiner* — Mina Shalaby
(74) *Attorney, Agent, or Firm* — Fujitsu Patent Center

(57) ABSTRACT

A transmission circuit of a transmission device transmits a signal to a reception circuit of a reception device via a plurality of signal paths included in a communication line. A first interface circuit is connected to the transmission circuit and one or more signal paths. A second interface circuit is connected to the transmission circuit and remaining signal paths expect for the one or more signal paths. A third interface circuit is connected to the reception circuit and the one or more signal paths. A fourth interface circuit is connected to the reception circuit and the remaining signal paths. An operation for transmitting and receiving the signal via the plurality of signal paths is changed to an operation for transmitting and receiving the signal via the remaining signal paths when the one or more signal paths enter a disconnected state.

5 Claims, 11 Drawing Sheets

(56) References Cited

FOREIGN PATENT DOCUMENTS

| | | |
|---|---|---|
| JP | 7-240710 | 9/1995 |
| JP | 11-225118 | 8/1999 |
| JP | 2010-232787 | 10/2010 |
| WO | 02/07347 A2 | 1/2002 |

OTHER PUBLICATIONS

Chinese Office Action mailed Jan. 22, 2016 for corresponding Chinese Patent Application No. 201410085542.3, with English Translation, 22 pages.

* cited by examiner

TRANSCEIVER SYSTEM, TRANSMISSION DEVICE, RECEPTION DEVICE, AND CONTROL METHOD OF TRANSCEIVER SYSTEM

CROSS-REFERENCE TO RELATED APPLICATION

This application is based upon and claims the benefit of priority of the prior Japanese Patent Application No. 2013-057009, filed on Mar. 19, 2013, the entire contents of which are incorporated herein by reference.

FIELD

The embodiments discussed herein are related to a transceiver system, a transmission device, a reception device, and a control method of a transceiver system.

BACKGROUND

In recent years, improvements in a communication data rate and an increase in a transmission distance with the growing scale of a system have been remarkable in an information processing system where a plurality of information processing devices (computers) are connected by a communication network. In association with this, an optical communication has been widely used as a replacement for an electric communication in a middle-to-long range communication between information processing devices. In a large-scale system, also a point that a weight of an optical cable can be made lighter than that of an electric cable is an advantage in the use of an optical communication.

FIG. 1 illustrates a configuration example of an information processing system using a conventional optical communication. The information processing system illustrated in FIG. 1 includes an information processing device 101, an information processing device 102, and an optical transmission link 103.

The information processing device 101 includes a transmission and reception circuit 111 and an interface circuit 112, whereas the information processing device 102 includes a transmission and reception circuit 121 and an interface circuit 122. The optical transmission link 103 is a communication line between the information processing device 101 and the information processing device 102, and includes four signal paths. Each of the signal paths included in the optical transmission link 103 is sometimes referred to as a lane.

The transmission and reception circuit 111 and the interface circuit 112 are connected by wires 113-1 to 113-4, whereas the transmission and reception circuit 121 and the interface circuit 122 are connected by wires 123-1 to 123-4. A wire 113-$i$ and a wire 123-$i$ ($i$=1 to 4) belong to an ith lane among the four lanes included in the optical transmission link 103.

The interface circuit 112 and the interface circuit 122 respectively include a transmission conversion element for converting an electric signal to be transmitted to the optical transmission link 103 into an optical signal, and a reception conversion element for converting an optical signal received from the optical transmission link 103 into an electric signal. One transmission conversion element and one reception conversion element are provided for every specified number of lanes in many cases. In this example, one conversion element 201 is provided for the four lanes as illustrated in FIG. 2.

However, the conversion elements provided in the interface circuit 112 and the interface circuit 122 have a characteristic such that failures are relatively prone to occur. By way of example, for a 10-Gbps conversion element, a failure rate per lane is approximately 50 fit. In a small-scale system using approximately 20 conversion elements, a failure rate of the conversion elements does not matter. However, in a large-scale system using several thousands to several tens of thousands of conversion elements, a failure rate of the conversion elements matters.

One of forms of failures of the conversion element 201 is a 1-lane failure by which only one lane among a plurality of lanes connected to the conversion element 201 enters a state (disconnected state) disabled to transmit and receive a signal. As measures taken against the 1-lane failure, a technique of dynamic lane degeneration, which is adopted by interface standards such as Peripheral Components Interconnect Express (PCI-Express), InfiniBand, and the like, is widely used. By performing the dynamic lane degeneration, a communication can be continued with remaining normal lanes when some of a plurality of lanes used as an optical transmission link are disconnected.

In the meantime, as illustrated in FIG. 4, also an all-lane failure by which all lanes of the conversion element 201 enter into a disconnected state due to a failure of a power system or a control system of an information processing device sometimes occurs. Accordingly, in an information processing system adopting conversion elements, measures to suppress an influence of a failure is sometimes taken by making optical transmission links redundant based on the assumption that the failure of a conversion element occurs.

FIG. 5 illustrates a configuration example of the information processing system where optical transmission links are made redundant. The information processing system illustrated in FIG. 5 includes the information processing device 101, the information processing device 102, the optical transmission link 103, and an optical transmission link 501.

The information processing device 101 illustrated in FIG. 5 has a configuration implemented by adding an interface circuit 511 to the information processing device 101 illustrated in FIG. 1, whereas the information processing device 102 illustrated in FIG. 5 has a configuration implemented by adding an interface circuit 521 to the information processing device 102 illustrated in FIG. 1.

The transmission and reception circuit 111 and the interface circuit 511 are connected by wires 512-1 to 512-4, whereas the transmission and reception circuit 121 and the interface circuit 521 are connected by wires 522-1 to 522-4. An ith ($i$=1 to 4) lane among four lanes included in the optical transmission link 501 runs through a wire 512-$i$ and a wire 522-$i$.

With such an information processing system, a communication can be made by using eight lanes including the four lanes of the optical transmission link 103 and those of the optical transmission link 501 between the information processing device 101 and the information processing device 102. In this case, even if an all-lane failure of a conversion element of the interface circuit 112 or the interface circuit 511 of the information processing device 101 occurs, a communication can be continued by using the four lanes connected to the other interface circuit.

A wireless relay system that can continue a mobile communication service within a closed space even if a failure of a transmission line or an antenna for a mobile station occurs in a mobile communication system is known (for example, see Patent Document 1). In this wireless relay system, a plurality of antennas are provided within a closed space such as an underground city, a tunnel, or the like that radiowaves from a base station do not reach. These antennas are partitioned into a plurality of groups, and arranged so that a service area of each of the antennas overlaps that of an antenna that belongs to a different group and is adjacent. Then, the wireless relay device feeds power to antennas that belong to each of the groups through a transmission line corresponding to each of the groups.

Also a ring network having a capability of recovering a failure of a multiplexing device that drops, adds, or regenerates and relays an optical signal is known (for example, see Patent Document 2). A node device in this ring network includes an optical switch for switching an optical transmission line to and from which an optical signal is input and output, a wavelength demultiplexer for demultiplexing a wavelength-multiplexed signal output from an optical switch, and a wavelength multiplexer for wavelength-multiplexing an optical signal input to an optical switch. The node device further includes a multiplexing device, which is provided between the wavelength demultiplexer and the wavelength multiplexer, for dropping, adding, or regenerating and relaying an optical signal having a demultiplexed wavelength.

A transmission system for maintaining a connection of the entire link by bypassing a failure that has occurred in some of lanes, by using only a normal lane, and by reducing a communication capacity in a multi-lane transmission is also known (for example, see Patent Document 3). In this transmission system, a transmitter and a relay device are connected by a first transmission line, the relay device and a receiver are connected by a second transmission line, and the transmitter, the relay device, and the receiver have virtual lanes. The transmitter partitions transmission data into data strings, the number of which is that of available virtual lanes, based on information of used lanes. The relay device monitors a failure of each transmission lane of the first transmission line and each virtual lane. The receiver monitors a failure of each transmission lane of the second transmission line and each virtual lane, decides an available virtual lane, transmits information of used lanes to the transmitter, and restores the partitioned data strings to the transmission data.

Patent Document 1: Japanese Laid-open Patent Publication No. 7-240710

Patent Document 2: Japanese Laid-open Patent Publication No. 11-225118

Patent Document 3: Japanese Laid-open Patent Publication No. 2010-232787

SUMMARY

According to an aspect of the embodiments, a transceiver system includes a transmission device and a reception device.

The transmission device includes a transmission circuit, a first interface circuit, a second interface circuit, and a first control circuit. The transmission circuit transmits a signal to the reception device via a plurality of signal paths included in a communication line between the transmission device and the reception device. The first interface circuit is connected to the transmission circuit, and also connected to one or more signal paths among the plurality of signal paths. The second interface circuit is connected to the transmission circuit, and also connected to the remaining signal paths except for the one or more signal paths among the plurality of signal paths.

The first control circuit changes an operation for transmitting a signal via a plurality of signal paths to an operation for transmitting the signal via the remaining signal paths connected to the second interface circuit when the one or more signal paths enter a disconnected state.

The reception device includes a reception circuit, a third interface circuit, a fourth interface circuit, and a second control circuit. The reception circuit receives the signal from the transmission device via the plurality of signal paths. The third interface circuit is connected to the reception circuit, and also connected to the one or more signal paths. The fourth interface circuit is connected to the reception circuit, and also connected to the remaining signal paths.

The second control circuit changes an operation for receiving the signal via the plurality of signal paths to an operation for receiving the signal via the remaining signal paths connected to the fourth interface circuit when the one or more signal paths enter the disconnected state.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
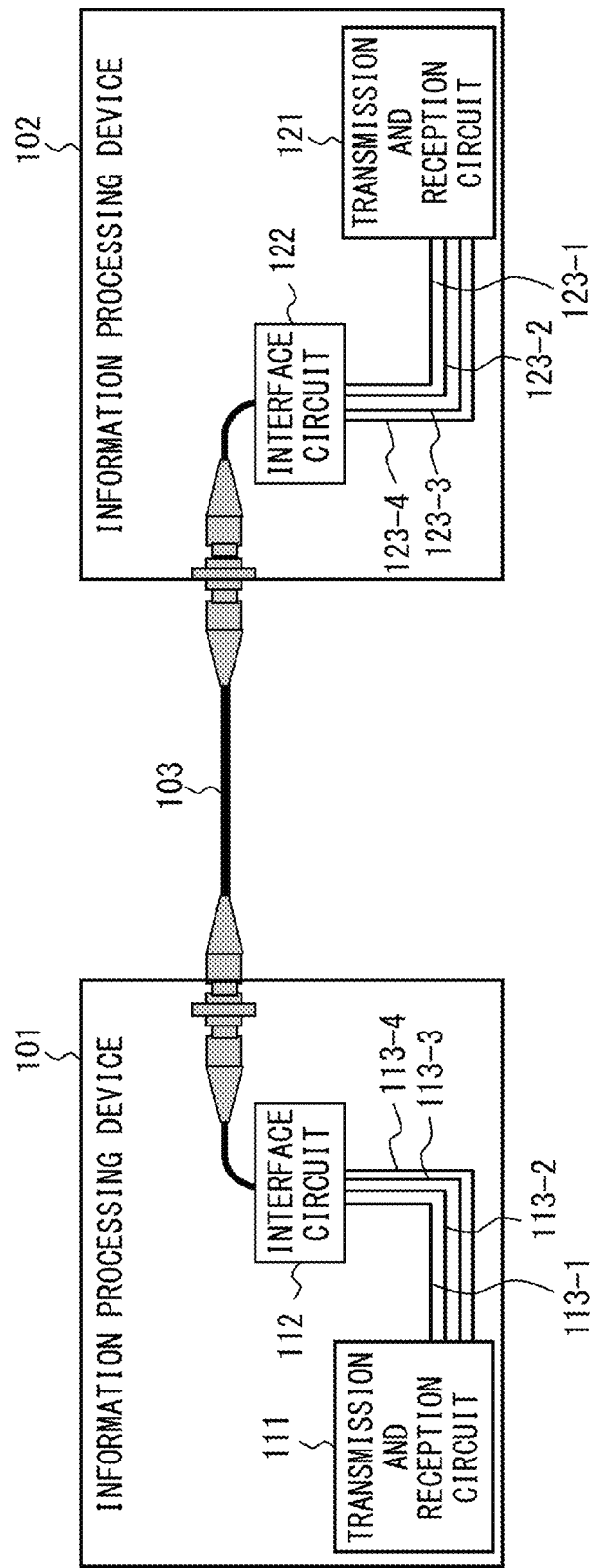
FIG. 1 illustrates a configuration of a conventional information processing system.
Figure 2:
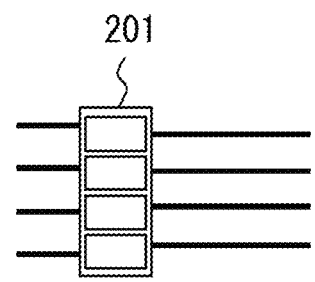
FIG. 2 illustrates a conversion element.
Figure 3:
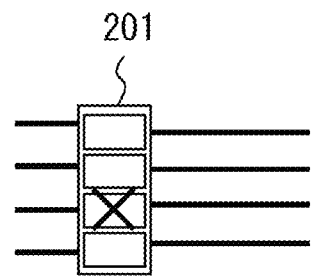
FIG. 3 illustrates a 1-lane failure.
Figure 4:
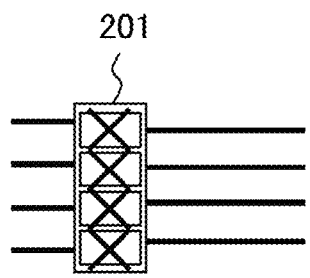
FIG. 4 illustrates an all-lane failure.
Figure 5:
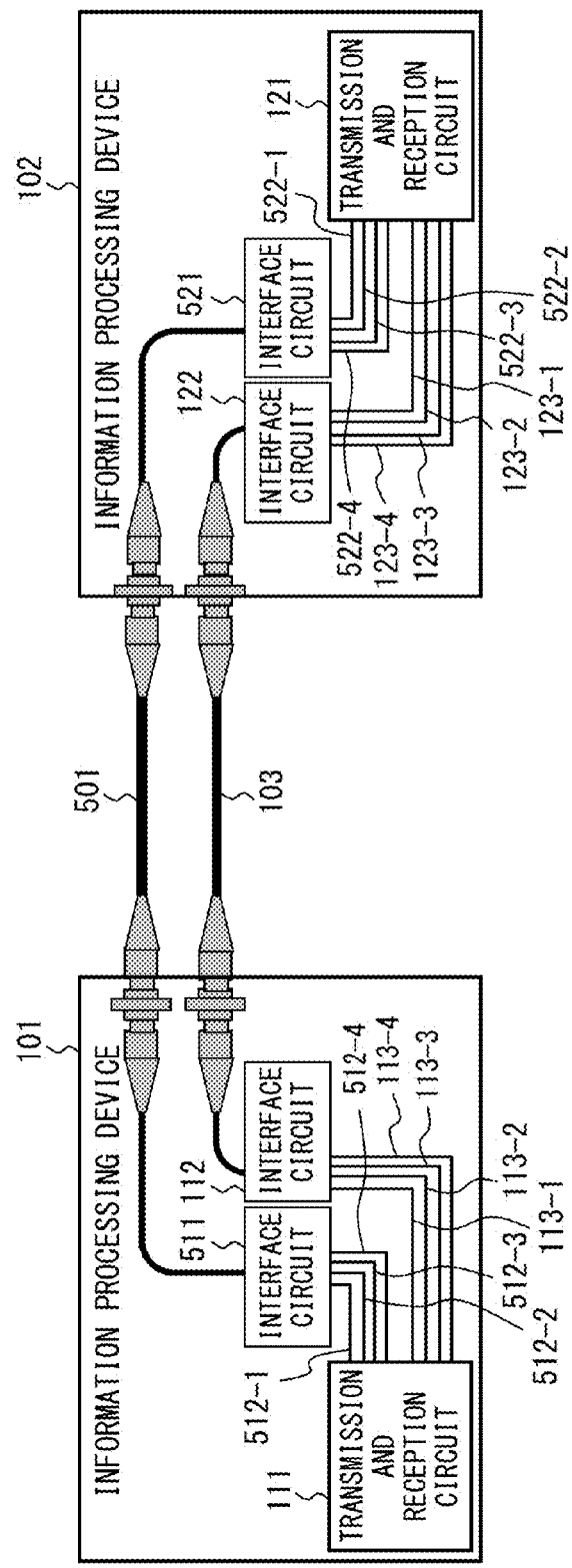
FIG. 5 illustrates a configuration of an information processing system where conventional optical transmission links are made redundant.

In the information processing system illustrated in FIG. 5, a communication is made by using lanes, the number of which is twice that of the information processing system illustrated in FIG. 1, between the information processing device 101 and the information processing device 102 so that the communication can be continued even if an all-lane failure of a conversion element occurs. In this case, the added interface circuits 511 and 521 are used for the same communication as the optical transmission link 103, and not used for another application purpose such as a communication with a third information processing device. Accordingly, this information processing system has a problem such that an application purpose of an interface circuit included in the information processing device is limited.

Such a problem occurs not only in an information processing system that makes a communication by using a plurality of lanes included in an optical transmission link but also in other systems that make a communication by using a plurality of signal paths included in a communication line.

Embodiments are described in detail below with reference to the drawings.

Figure 6:
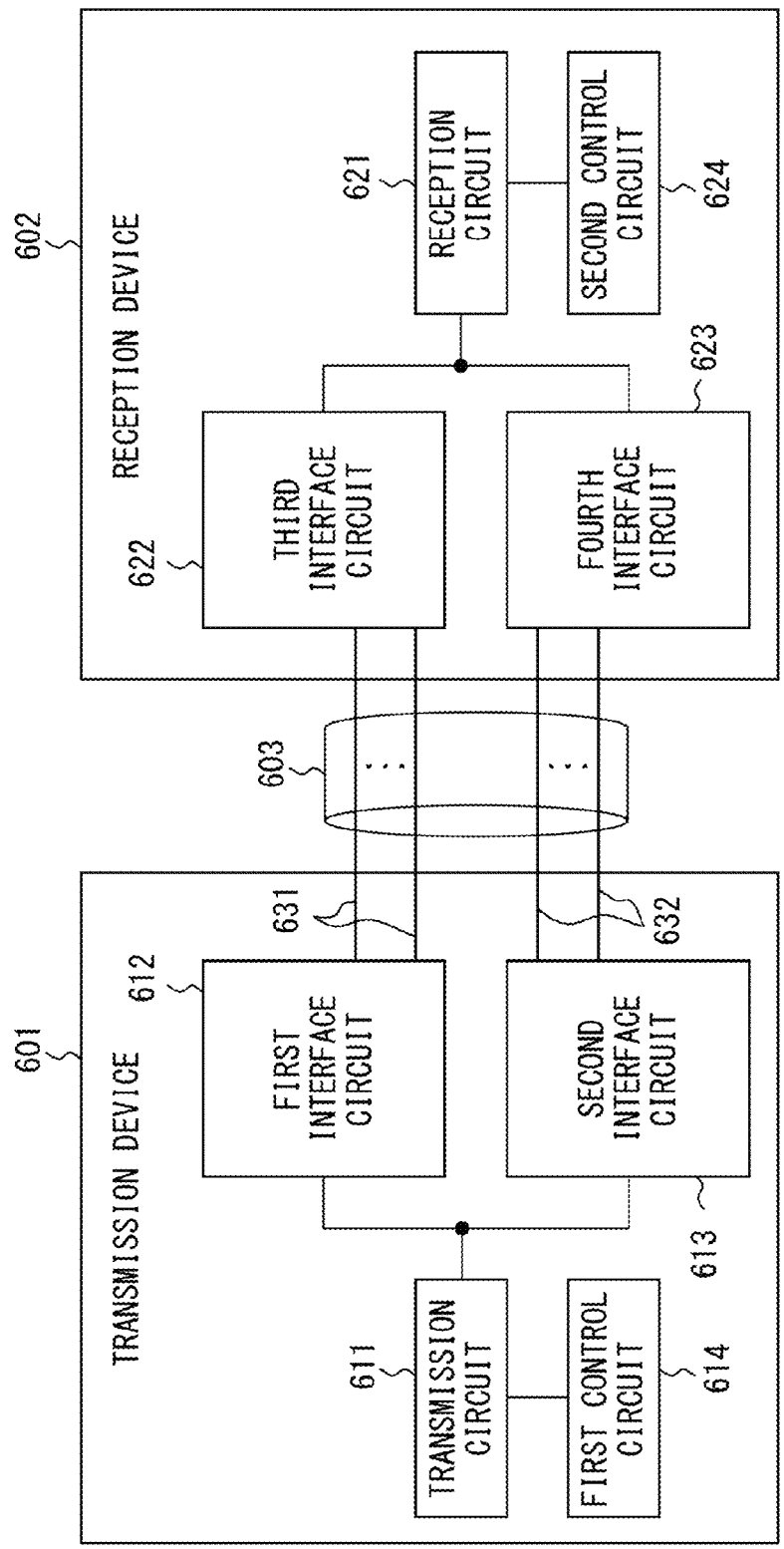
FIG. 6 illustrates a configuration of a transceiver system.

FIG. 6 illustrates a configuration example of a transceiver system according to an embodiment. The transceiver system illustrated in FIG. 6 includes a transmission device 601 and a reception device 602.

The transmission device 601 includes a transmission circuit 611, a first interface circuit 612, a second interface circuit 613, and a first control circuit 614. The transmission circuit 611 transmits a signal to the reception device 602 via a plurality of signal paths included in a communication line 603 between the transmission device 601 and the reception device 602. The first interface circuit 612 is connected to the transmission circuit 611, and also connected to one or more signal paths 631 among the plurality of signal paths. The second interface circuit 613 is connected to the transmission circuit 611, and also connected to remaining signal paths 632 except for the one or more signal paths 631 among the plurality of signal paths.

The reception device 602 includes a reception circuit 621, a third interface circuit 622, a fourth interface circuit 623, and a second control circuit 624. The reception circuit 621 receives the signal from the transmission device 601 via the plurality of signal paths. The third interface circuit 622 is connected to the reception circuit 621, and also connected to the one or more signal paths 631. The fourth interface circuit 623 is connected to the reception circuit 621, and also connected to the remaining signal paths 632.

Figure 7:
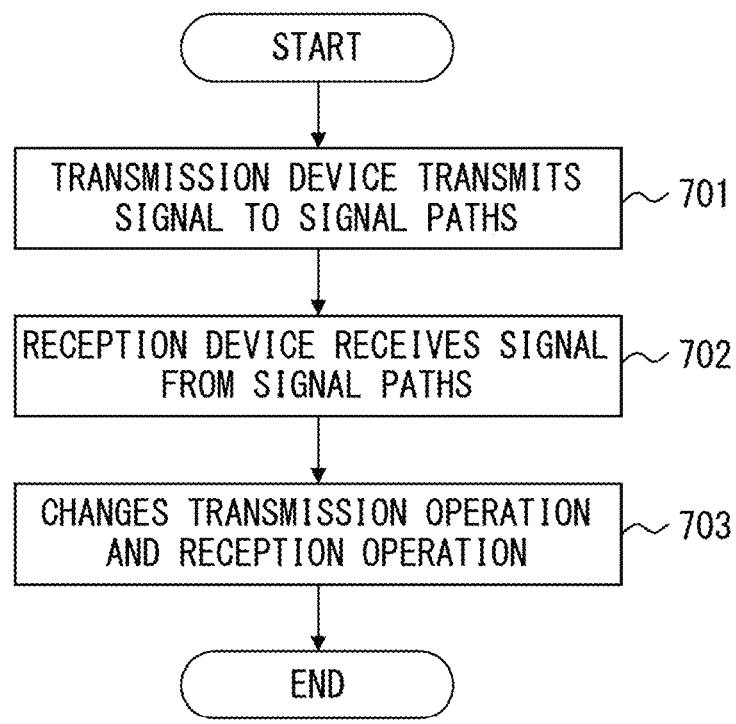
FIG. 7 is a flowchart illustrating a control method of a transceiver system.

FIG. 7 is a flowchart illustrating an example of a control method of the transceiver system illustrated in FIG. 6. Initially, the transmission device 601 transmits a signal to a plurality of signal paths included in the communication line 603 by using the first interface circuit 612 and the second interface circuit 613 (step 701). Next, the reception device 602 receives the signal from the plurality of signal paths by using the third interface circuit 622 and the fourth interface circuit 623 (step 702).

When the one or more signal paths 631 enter a disconnected state, the first control circuit 614 controls the transmission circuit 611 to change an operation for transmitting the signal via the plurality of signal paths to an operation for transmitting the signal via the remaining signal paths 632 (step 703). At this time, the second control circuit 624 controls the reception circuit 621 to change an operation for receiving the signal from the plurality of signal paths to an operation for receiving the signal from the remaining signal paths 632.

With such a transceiver system, a communication can be continued by using the remaining signal paths 632 even if the one or more of signal paths 631 enter a disconnected state.

Additionally, in the transmission device 601, only some signal paths 631 among the plurality of signal paths included in the communication line 603 are connected to the first interface circuit 612, so that a signal path for another application purpose can be connected to the first interface circuit 612. Similarly, since only some signal paths 632 are connected to the second interface circuit 613, a signal path for another application purpose can be connected to the second interface circuit 613.

In contrast, in the reception device 602, only some signal paths 631 among the plurality of signal paths included in the communication line 603 are connected to the third interface circuit 622. Therefore, a signal path for another application purpose can be connected to the third interface circuit 622. Similarly, since only some signal paths 632 are connected to the fourth interface circuit 623, a signal path for another application purpose can be connected to the fourth interface circuit 623.

Accordingly, a communication can be continued even if one or more signal paths connected to one interface circuit enter a disconnected state while flexibly using a plurality of interface circuits included in the transceiver system.

Figure 8:
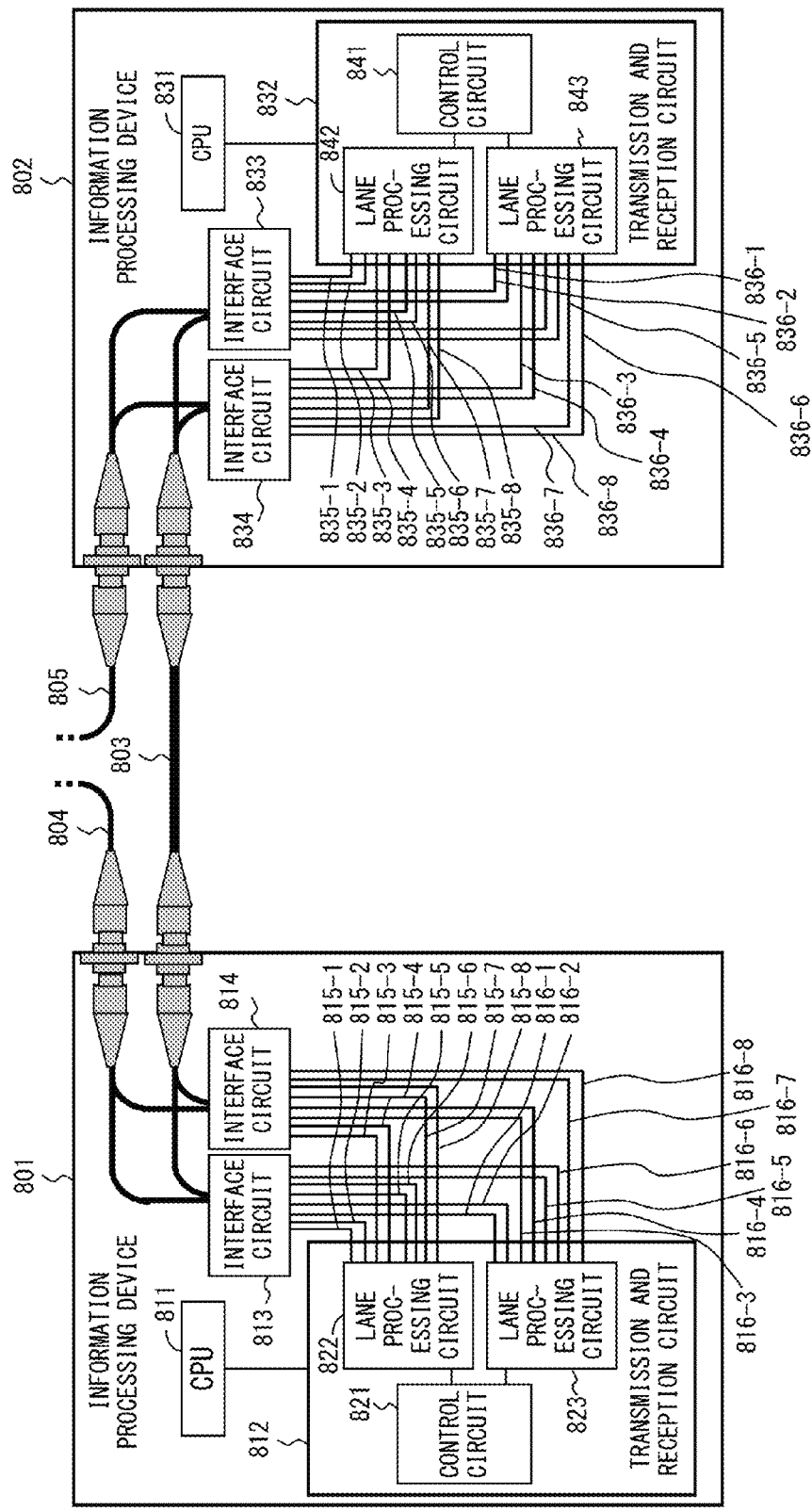
FIG. 8 illustrates a configuration of a first information processing system.

FIG. 8 illustrates a configuration example of the information processing system according to the embodiment. The information processing system illustrated in FIG. 8 is one example of the transceiver system illustrated in FIG. 6, and includes an information processing device 801, an information processing device 802, and optical transmission links 803 to 805. Each of the information processing device 801 and the information processing device 802 has functions of both the transmission device 601 and the reception device 602, which are illustrated in FIG. 6. The optical transmission link 803 corresponds to the communication line 603 illustrated in FIG. 6.

The information processing device 801 includes a Central Processing Unit (CPU) 811, a transmission and reception circuit 812, an interface circuit 813, and an interface circuit 814. The transmission and reception circuit 812 includes a control circuit 821, a lane processing circuit 822, and a lane processing circuit 823.

The interface circuit 813 and the interface circuit 814 respectively correspond, for example, to the first interface circuit 612 and the second interface circuit 613, which are illustrated in FIG. 6. The lane processing circuit 823 corresponds, for example, to the transmission circuit 611 illustrated in FIG. 6, and the control circuit 821 corresponds, for example, to the first control circuit 614.

The information processing device 802 includes a CPU 831, a transmission and reception circuit 832, an interface circuit 833, and an interface circuit 834. The transmission and reception circuit 832 includes a control circuit 841, a lane processing circuit 842, and a lane processing circuit 843.

The interface circuit 833 and the interface circuit 834 respectively correspond, for example, to the third interface circuit 622 and the fourth interface circuit 623, which are illustrated in FIG. 6. The lane processing circuit 843 corresponds, for example, to the reception circuit 621 illustrated in FIG. 6, and the control circuit 841 corresponds, for example, to the second control circuit 624.

The transmission and reception circuit 812 and the transmission and reception circuit 832 are, for example, circuits for making a bidirectional serial communication in accordance with a standard such as PCI-Express, InfiniBand, or the like.

The optical transmission link 803 is a communication line between the information processing device 801 and the information processing device 802. The optical transmission link 804 is a communication line between the information processing device 801 and another processing device (not illustrated). The optical transmission link 805 is a communication line between the information processing device 802 and another information processing device (not illustrated). Information processing devices at a connection destination of the optical transmission link 804 and the optical transmission link 805 may be the same information processing device or different information processing devices.

Each of the optical transmission links includes four lanes, each of which includes one optical fiber for a transmission signal and one optical fiber for a reception signal. Accordingly, each of the optical transmission links includes eight optical fibers.

Two lanes of the optical transmission link 803 are connected to the interface circuit 813 and the interface circuit 833, and the remaining two lanes are connected to the interface circuit 814 and the interface circuit 834. Two lanes of the optical transmission link 804 are connected to the interface circuit 813, and the remaining two lanes are connected to the interface circuit 814. Two lanes of the optical transmission link 805 are connected to the interface circuit 833, and the remaining two lanes are connected to the interface circuit 834.

As described above, each of the optical transmission links is connected by straddling the two interface circuits within each of the information processing devices.

The lane processing circuit 822 and the interface circuit 813 of the information processing device 801 are connected by a wire 815-1, a wire 815-2, a wire 815-5, and a wire 815-6. The lane processing circuit 822 and the interface circuit 814 are connected by a wire 815-3, a wire 815-4, a wire 815-7, and a wire 815-8. The wires 815-1 to 815-4 are wires for a transmission signal of the four lanes, whereas the wires 815-5 to 815-8 are wires for a reception signal of these lanes.

Additionally, the lane processing circuit 823 and the interface circuit 813 are connected by a wire 816-1, a wire 816-2, a wire 816-5, and a wire 816-6. The lane processing circuit 823 and the interface circuit 814 are connected by a wire 816-3, a wire 816-4, a wire 816-7, and a wire 816-8. The wires 816-1 to 816-4 are wires for a transmission signal of the four lanes. The wires 816-5 to 816-8 are wires for a reception signal of these lanes.

The lane processing circuit 842 and the interface circuit 833 of the information processing device 802 are connected by a wire 835-1, a wire 835-2, a wire 835-5, and a wire 835-6. The lane processing circuit 842 and the interface circuit 834 are connected by a wire 835-3, a wire 835-4, a wire 835-7, and a wire 835-8. The wires 835-1 to 835-4 are wires for a reception signal of the four lanes, whereas the wires 835-5 to 835-8 are wires for a transmission signal of these lanes.

Furthermore, the lane processing circuit 843 and the interface circuit 833 are connected by a wire 836-1, a wire 836-2, a wire 836-5, and a wire 836-6. The lane processing circuit 843 and the interface circuit 834 are connected by a wire 836-3, a wire 836-4, a wire 836-7, and a wire 836-8. The wires 836-1 to 836-4 are wires for a reception signal of the four lanes, whereas the wires 836-5 to 836-8 are wires for a transmission signal of these lanes.

Figure 9:
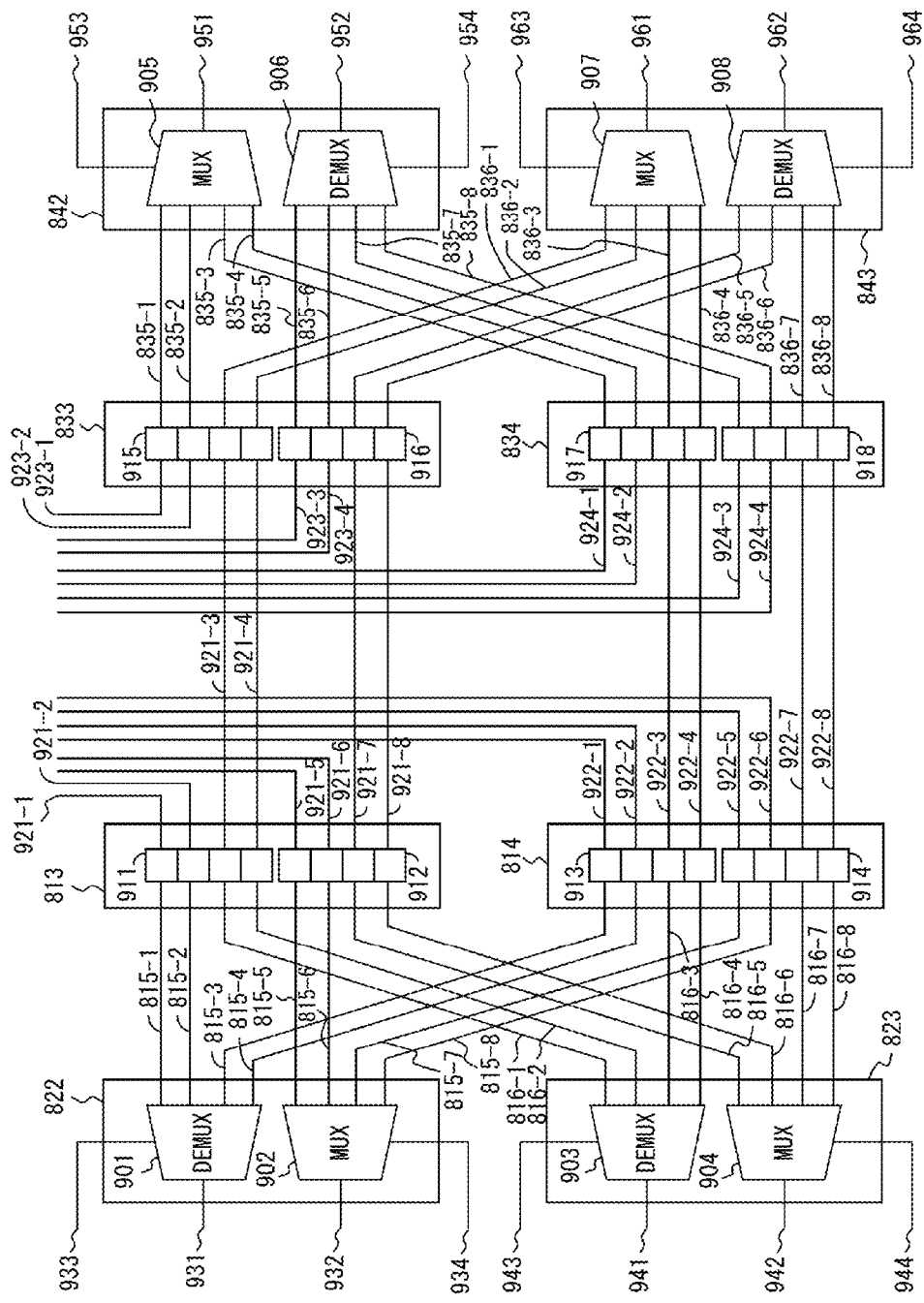
FIG. 9 illustrates connection relationships among circuits.

FIG. 9 illustrates connection relationships among the lane processing circuit 822, the lane processing circuit 823, the interface circuit 813, the interface circuit 814, the interface circuit 833, the interface circuit 834, the lane processing circuit 842, and the lane processing circuit 843, which are illustrated in FIG. 8.

The lane processing circuit 822 includes a demultiplexer (DEMUX) 901 and a multiplexer (MUX) 902. The lane processing circuit 823 includes a DEMUX 903 and a MUX 904. The interface circuit 813 includes a transmission conversion element 911 for converting an electric signal into an optical signal, and a reception conversion element 912 for converting an optical signal into an electric signal. The interface circuit 814 includes a transmission conversion element 913 and a reception conversion element 914.

The lane processing circuit 842 includes a MUX 905 and a DEMUX 906. The lane processing circuit 843 includes a MUX 907 and a DEMUX 908. The interface circuit 833 includes a reception conversion element 915 and a transmission conversion element 916. The interface circuit 834 includes a reception conversion element 917 and a transmission conversion element 918.

The DEMUX 901 and the transmission conversion element 911 are connected by the wire 815-1 and the wire 815-2. The DEMUX 901 and the transmission conversion element 913 are connected by the wire 815-3 and the wire 815-4. The MUX 902 and the reception conversion element 912 are connected by the wire 815-5 and the wire 815-6. The MUX 902 and the reception conversion element 914 are connected by the wire 815-7 and the wire 815-8.

The DEMUX 903 and the transmission conversion element 911 are connected by the wire 816-1 and the wire 816-2. The DEMUX 903 and the transmission conversion element 913 are connected by the wire 816-3 and the wire 816-4. The MUX 904 and the reception conversion element 912 are connected by the wire 816-5 and the wire 816-6. The MUX 904 and the reception conversion element 914 are connected by the wire 816-7 and the wire 816-8.

The MUX 905 and the reception conversion element 915 are connected by the wire 835-1 and the wire 835-2. The MUX 905 and the reception conversion element 917 are connected by the wire 835-3 and the wire 835-4. The DEMUX 906 and the transmission conversion element 916 are connected by the wire 835-5 and the wire 835-6. The DEMUX 906 and the transmission conversion element 918 are connected by the wire 835-7 and the wire 835-8.

The MUX 907 and the reception conversion element 915 are connected by the wire 836-1 and the wire 836-2. The MUX 907 and the reception conversion element 917 are connected by the wire 836-3 and the wire 836-4. The DEMUX 908 and the transmission conversion element 916 are connected by the wire 836-5 and the wire 836-6. The DEMUX 908 and the transmission conversion element 918 are connected by the wire 836-7 and the wire 836-8.

The transmission conversion element 911 and the reception conversion element 915 are connected by an optical fiber 921-3 and an optical fiber 921-4. The transmission conversion element 916 and the reception conversion element 912 are connected by an optical fiber 921-7 and an optical fiber 921-8. The transmission conversion element 913 and the reception conversion element 917 are connected by an optical fiber 922-3 and an optical fiber 922-4. The transmission conversion element 918 and the reception conversion element 914 are connected by an optical fiber 922-7 and an optical fiber 922-8.

The transmission conversion element 911 is connected to another information processing device by an optical fiber 921-1 and an optical fiber 921-2. The reception conversion element 912 is connected to another information processing device by an optical fiber 921-5 and an optical fiber 921-6. The transmission conversion element 913 is connected to another information processing device by an optical fiber 922-1 and an optical fiber 922-2. The reception conversion element 914 is connected to another information processing device by an optical fiber 922-5 and an optical fiber 922-6.

The reception conversion element 915 is connected to another information processing device by an optical fiber 923-1 and an optical fiber 923-2. The transmission conversion element 916 is connected to another information processing device by an optical fiber 923-3 and an optical fiber 923-4. The reception conversion element 917 is connected to another information processing device by an optical fiber 924-1 and an optical fiber 924-2. The transmission conversion element 918 is connected to another information processing device by an optical fiber 924-3 and an optical fiber 924-4.

The wire 815-1, the wire 815-5, the optical fiber 921-1, and the optical fiber 921-5 belong to a first lane included in the optical transmission link 804. The wire 815-2, the wire 815-6, the optical fiber 921-2, and the optical fiber 921-6 belong to a second lane included in the optical transmission link 804.

The wire 815-3, the wire 815-7, the optical fiber 922-1, and the optical fiber 922-5 belong to a third lane included in the optical transmission link 804. The wire 815-4, the wire 815-8, the optical fiber 922-2, and the optical fiber 922-6 belong to a fourth lane included in the optical transmission link 804.

The wire 835-1, the wire 835-5, the optical fiber 923-1, and the optical fiber 923-3 belong to a first lane included in the optical transmission link 805. The wire 835-2, the wire 835-6, the optical fiber 923-2, and the optical fiber 923-4 belong to a second lane included in the optical transmission link 805.

The wire 835-3, the wire 835-7, the optical fiber 924-1, and the optical fiber 924-3 belong to a third lane included in the optical transmission link 805. The wire 835-4, the wire 835-8, the optical fiber 924-2, and the optical fiber 924-4 belong to a fourth lane included in the optical transmission link 805.

The wire 816-1, the wire 816-5, the optical fiber 921-3, the optical fiber 921-7, the wire 836-1, and the wire 836-5 belong to a first lane included in the optical transmission link 803. The wire 816-2, the wire 816-6, the optical fiber 921-4, the optical fiber 921-8, the wire 836-2, and the wire 836-6 belong to a second lane included in the optical transmission link 803.

The wire 816-3, the wire 816-7, the optical fiber 922-3, the optical fiber 922-7, the wire 836-3, and the wire 836-7 belong to a third lane included in the optical transmission link 803. The wire 816-4, the wire 816-8, the optical fiber 922-4, the optical fiber 922-8, the wire 836-4, and the wire 836-8 belong to a fourth lane included in the optical transmission link 803.

The DEMUX 901 splits and outputs a transmission signal 931 from the CPU 811 to one or more wires among the wires 815-1 to 815-4 according to a control signal 933 from the control circuit 821. The MUX 902 multiplexes input signals from one or more wires among the wires 815-5 to 815-8 according to a control signal 934 from the control circuit 821, and outputs a reception signal 932 to the CPU 811.

The DEMUX 903 splits and outputs a transmission signal 941 from the CPU 811 to one or more wires among the wires 816-1 to 816-4 according to a control signal 943 from the control circuit 821. The MUX 904 multiplexes input signals from one or more wires among the wires 816-5 to 816-8 according to a control signal 944 from the control circuit 821, and outputs a reception signal 942 to the CPU 811.

The MUX 905 multiplexes input signals from one or more wires among the wires 835-1 to 835-4 according to a control signal 953 from the control circuit 841, and outputs a reception signal 951 to the CPU 831. The DEMUX 906 splits and outputs a transmission signal 952 from the CPU 831 to one or more wires among the wires 835-5 to 835-8 according to a control signal 954 from the control circuit 841.

The MUX 907 multiplexes input signals from one or more wires among the wires 836-1 to 836-4 according to a control signal 953 from the control circuit 841, and outputs a reception signal 961 to the CPU 831. The DEMUX 908 splits and outputs a transmission signal 962 from the CPU 831 to one or more wires among the wires 836-5 to 836-8 according to a control signal 964 from the control circuit 841.

In this way, a signal is transmitted and received by using the four lanes included in the optical transmission link 803 between the lane processing circuit 823 and the lane processing circuit 843.

In the information processing device 801, a circuit other than the CPU 811 may generate the transmission signal 931 and the transmission signal 941, and a circuit other than the CPU 811 may receive the reception signal 932 and the reception signal 942. Moreover, in the information processing device 802, a circuit other than the CPU 831 may generate the transmission signal 952 and the transmission signal 962, and a circuit other than the CPU 831 may receive the reception signal 951 and the reception signal 961.

Figure 10:
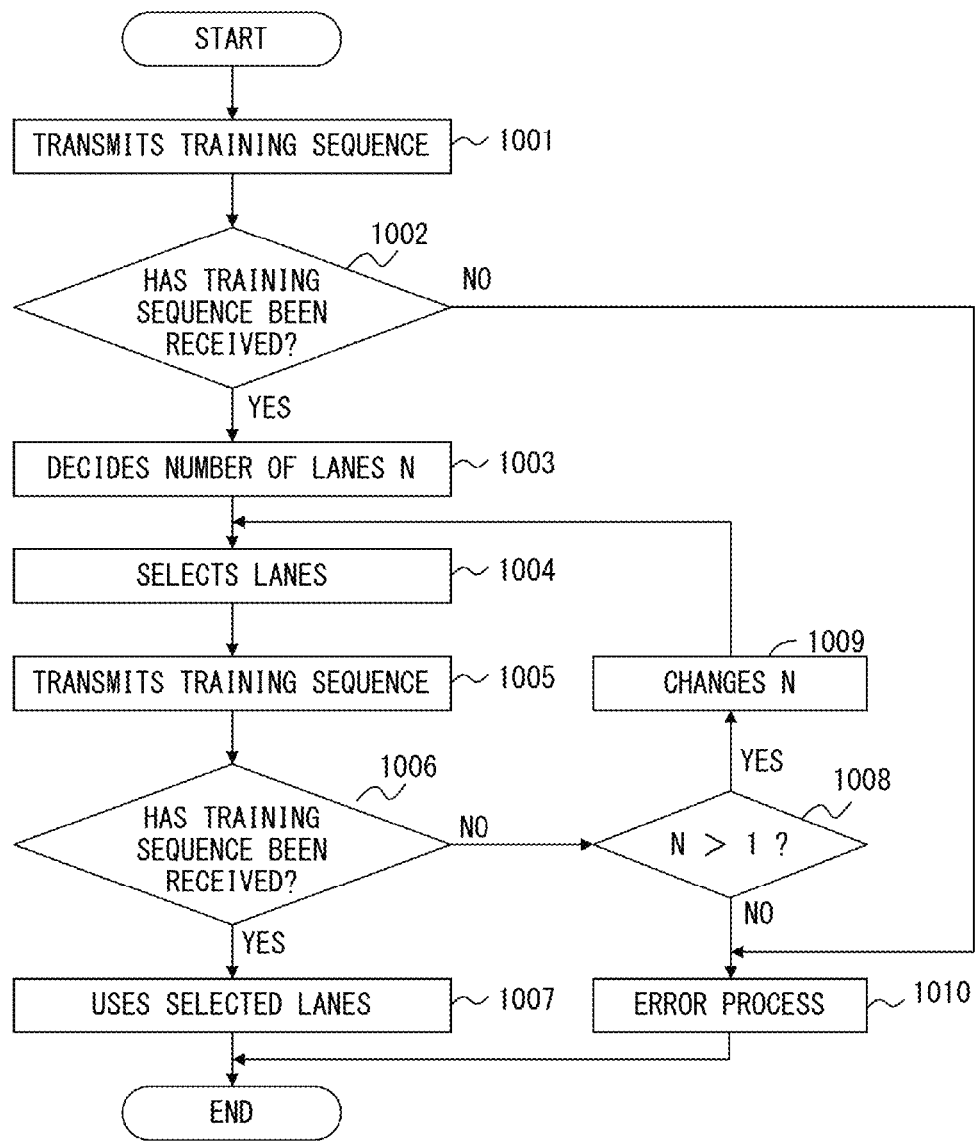
FIG. 10 is a flowchart illustrating a lane control.

FIG. 10 is a flowchart illustrating an example of a lane control performed by each of the control circuit 821 and the control circuit 841, which are illustrated in FIG. 8. This lane control may be performed in specified cycles in each of the information processing devices, or may be performed at specified timing such as timing when each of the information processing devices transmits a signal.

Procedures of the lane control are described below by taking, as an example, a case where the control circuit 821 of the information processing device 801 controls the lanes included in the optical transmission link 803. Also a case where the control circuit 821 controls the lanes included in the optical transmission link 804 is similar. Moreover, a case where the control circuit 841 of the information processing device 802 controls the lanes included in the optical transmission link 803 and the optical transmission link 805 is similar.

Initially, the control circuit 821 transmits a training sequence to the optical transmission link 803 (step 1001). At this time, the control circuit 821 inputs the training sequence to the DEMUX 903 as the transmission signal 941, and controls the DEMUX 903 with the control signal 943 so that the training sequence is output to the wires 816-1 to 816-4. In this way, the training sequence is transmitted to the four lanes included in the optical transmission link 803.

Upon receipt of the training sequence, the information processing device 802 at the connection destination of the optical transmission link 803 transmits a training sequence as a reply. The control circuit 821 controls the MUX 904 with the control signal 944 so that the training sequence input from the wires 816-5 to 816-8 is output as the reception signal 942.

Next, the control circuit 821 monitors the reception signal 942, and detects whether or not the training sequence has been received from the information processing device 802 within a specified time period from the transmission of the training sequence (step 1002). If the training sequence has not been received from the information processing device 802 within the specified time period ("NO" in step S102), the control circuit 821 executes an error process (step 1010) to terminate the lane control.

Alternatively, if the training sequence has been received from the information processing device 802 within the specified time period ("YES" in step 1002), the control circuit 821 decides the number of lanes N used in the optical transmission link 803 (step 1003).

At this time, the control circuit 821 identifies a lane that has received the training sequence from the information processing device 802, and decides N based on the number of the identified lanes. The control circuit 821 may use, for example, the number of lanes that have received the training sequence from the information processing device 802 as N, or a maximum even number that does not exceed the number of lanes as N.

Next, the control circuit 821 selects N lanes from among the lanes that have received the training sequence from the information processing device 802, and assigns serial numbers from 0 to N−1 to the selected N lanes as lane numbers (step 1004).

For example, when an all-lane failure of the transmission conversion element 911 or the reception conversion element 912 of the interface circuit 813 occurs and the first and the second lanes of the optical transmission link 803 enter a disconnected state, N is decided to be 2. Then, the third and the fourth lanes, which are connected to the normal interface circuit 814, of the optical transmission link 803 are selected, and 0 and 1 are respectively assigned as lane numbers.

Next, the control circuit 821 transmits a training sequence including information of the N lane numbers from 0 to N−1 to the selected lanes (step 1005). At this time, the control circuit 821 inputs the training sequence to the DEMUX 903 as the transmission signal 941, and controls the DEMUX 903 with the control signal 943 so that the training sequence is output to the wires of the selected lanes.

Upon receipt of the training sequence, the information processing device 802 transmits a training sequence including the received information of the N lane numbers as a reply. The control circuit 821 controls the MUX 904 with the control signal 944 so that the training sequence input from the wires of the selected lanes is output as the reception signal 942.

Next, the control circuit 821 monitors the reception signal 942, and detects whether or not the training sequence including the transmitted information of the lane numbers has been received from all the selected lanes within a specified time period from the transmission of the training sequence (step 1006).

If the training sequence including the transmitted information of the lane numbers has not been received from any of the selected lanes within the specified time period ("NO" in step 1006), the control circuit 821 checks whether or not N is larger than 1 (step 1008). If N is larger than 1 ("YES" in step 1008), the control circuit 821 changes the number of lanes N to a smaller number (step 1009), and repeats the operations in and after step 1004.

At this time, the control circuit 821 identifies a lane that has received the training sequence including the transmitted information of the lane numbers, and decides N after being changed based on the number of the identified lanes. The control circuit 821 may use, for example, the number of lanes that have received the training sequence including the transmitted information of the lane numbers as N after being changed, or a maximum even number that does not exceed the number of lanes as N after being changed.

Alternatively, if N is 1 ("NO" in step 1008), the control circuit 821 executes an error process (step 1010) to terminate the lane control.

If the training sequence including the transmitted information of the lane numbers has been received from all the selected lanes within the specified time period ("YES" in step 1006), the control circuit 821 performs a control for communicating with the information processing device 802 by using the selected lanes (step 1007).

At this time, the control circuit 821 inputs the signal from the CPU 811 to the DEMUX 903 as the transmission signal 941, and controls the DEMUX 903 with the control signal 943 so that the transmission signal 941 is output to the wires of the selected lanes. Moreover, the control circuit 821 controls the MUX 904 with the control signal 944 so that the signal input from the wires of the selected lanes is output as the reception signal 942, and transfers the reception signal 942 to the CPU 811.

As a result, even if the all-lane failure of the interface circuit 813 occurs, the CPU 811 can continue a communication with the information processing device 802 by using only normal lanes that are not in a disconnected state.

The control circuit 821 can also control the lanes included in the optical transmission link 804 in a similar manner. As a result, even if an all-lane failure of the interface circuit 813 occurs, the CPU 811 can continue a communication with the information processing device at the connection destination of the optical transmission link 804 by using only normal lanes.

By repeating the operations in and after step 1004 after performing the operations in steps 1008 and 1009, lanes available to both of the information processing device 801 and the information processing device 802 are finally selected. Accordingly, even if the number of normal lanes detected by the information processing device 801 and that of normal lanes detected by the information processing device 802 are different, a communication can be continued by using only normal lanes common to both of the information processing devices.

Figure 11:
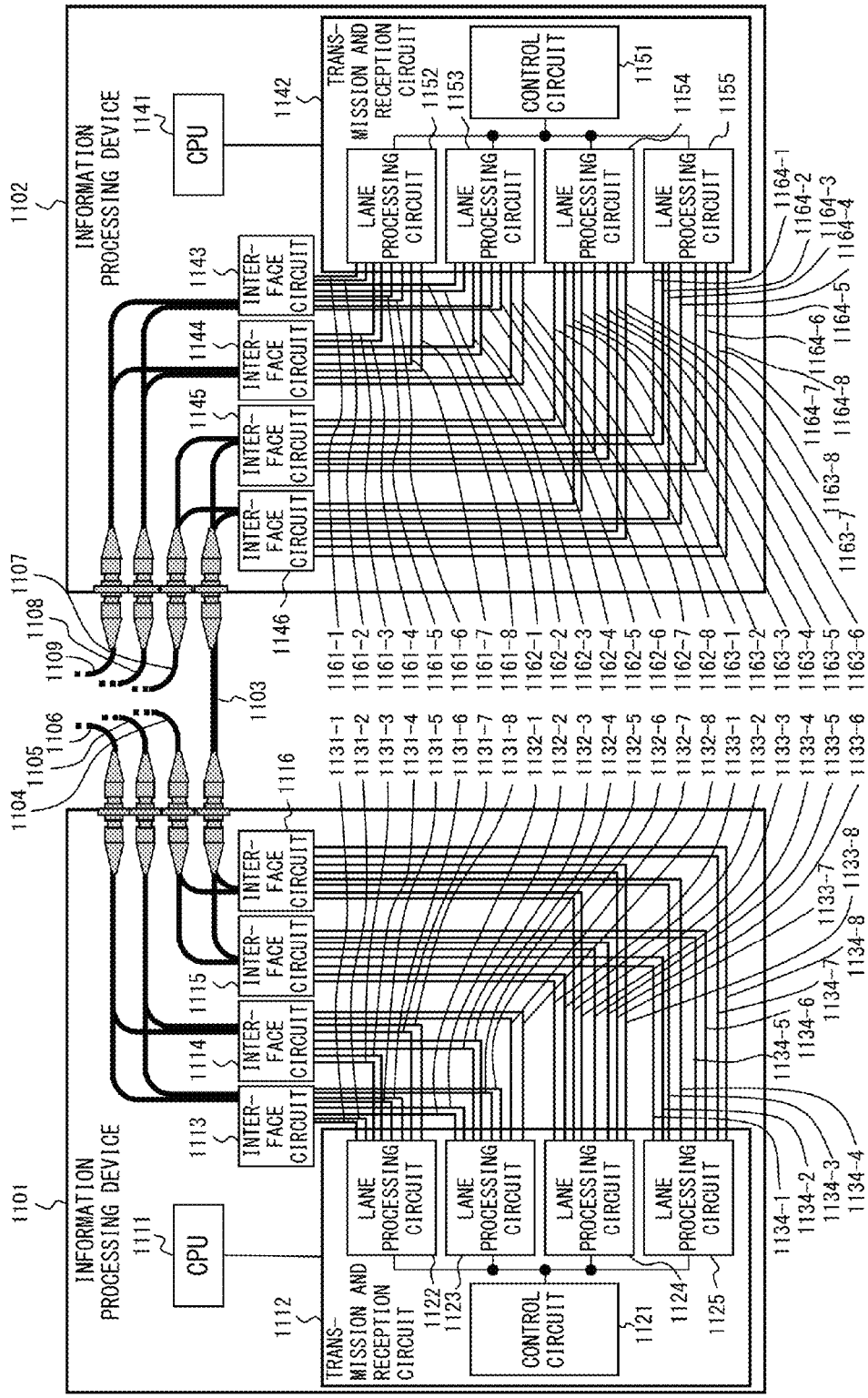
FIG. 11 illustrates a configuration of a second information processing system.

FIG. 11 illustrates another configuration example of the information processing system according to the embodiment. The information processing system illustrated in FIG. 11 is one example of the transceiver system illustrated in FIG. 6, and includes an information processing device 1101, an information processing device 1102, and an optical transmission links 1103 to 1109. Each of the information processing device 1101 and the information processing device 1102 has functions of both the transmission device 601 and the reception device 602, which are illustrated in FIG. 6. The optical transmission link 1103 corresponds to the communication line 603 illustrated in FIG. 6.

The information processing device 1101 includes a CPU 1111, a transmission and reception circuit 1112, and interface circuits 1113 to 1116. The transmission and reception circuit 1112 includes a control circuit 1121, and lane processing circuits 1122 to 1125.

The interface circuit 1115 and the interface circuit 1116 correspond, for example, to the first interface circuit 612 and the second interface circuit 613, which are illustrated in FIG. 6. The lane processing circuit 1125 corresponds, for example, to the transmission circuit 611 illustrated in FIG. 6, and the control circuit 1121 corresponds, for example, to the first control circuit 614.

The information processing device 1102 includes a CPU 1141, a transmission and reception circuit 1142, and interface circuits 1143 to 1146. The transmission and reception circuit 1142 includes a control circuit 1151, and lane processing circuits 1152 to 1155.

The interface circuit 1145 and the interface circuit 1146 correspond, for example, to the third interface circuit 622 and the fourth interface circuit 623, which are illustrated in FIG. 6. The lane processing circuit 1155 corresponds, for example, to the reception circuit 621 illustrated FIG. 6. The control circuit 1151 corresponds, for example, to the second control circuit 624.

The transmission and reception circuit 1112 and the transmission and reception circuit 1142 are, for example, circuits for making a bidirectional serial communication in accordance with a standard such as PCI-Express, InfiniBand, or the like.

The optical transmission link 1103 is a communication line between the information processing device 1101 and the information processing device 1102. The optical transmission links 1104 to 1106 are communication lines between the information processing device 1101 and another information processing device (not illustrated). The optical transmission links 1107 to 1109 are communication lines between the information processing device 1102 and another information processing device (not illustrated). Information processing devices at the connection destination of the optical transmission links 1104 to 1109 may be the same information processing device or different information processing devices. Each of the optical transmission links includes four lanes.

Two lanes of the optical transmission link 1103 are connected to the interface circuit 1115 and the interface circuit 1145, and the remaining two lanes are connected to the interface circuit 1116 and the interface circuit 1146. Two lanes of the optical transmission link 1104 are connected to the interface circuit 1115, and the remaining two lanes are connected to the interface circuit 1116. Two lanes of the optical transmission link 1107 are connected to the interface circuit 1145, and the remaining two lanes are connected to the interface circuit 1146.

Two lanes of the optical transmission link 1105 are connected to the interface circuit 1113, and the remaining two lanes are connected to the interface circuit 1114. Two lanes of the optical transmission link 1106 are connected to the interface circuit 1113, and the remaining two lanes are connected to the interface circuit 1114. Two lanes of the optical transmission link 1106 are connected to the interface circuit 1113, and the remaining two lanes are connected to the interface circuit 1114.

Two lanes of the optical transmission link 1108 are connected to the interface circuit 1143, and the remaining two lanes are connected to the interface circuit 1144. Two lanes of the optical transmission link 1109 are connected to the interface circuit 1143, and the remaining two lanes are connected to the interface circuit 1144.

In this way, each of the optical transmission links is connected by straddling the two interface circuits within each of the information processing devices.

The lane processing circuit 1122 and the interface circuit 1113 of the information processing device 1101 are connected by a wire 1131-1, a wire 1131-2, a wire 1131-5, and a wire 1131-6. The lane processing circuit 1122 and the interface circuit 1114 are connected by a wire 1131-3, a wire 1131-4, a wire 1131-7, and a wire 1131-8. The wires 1131-1 to 1131-4 are wires for the transmission signal of the four lanes, whereas the wires 1131-5 to 1131-8 are wires for the reception signal of these lanes.

The lane processing circuit 1123 and the interface circuit 1113 are connected by a wire 1132-1, a wire 1132-2, a wire 1132-5, and a wire 1132-6. The lane processing circuit 1123 and the interface circuit 1114 are connected by a wire 1132-3, a wire 1132-4, a wire 1132-7, and a wire 1132-8. The wires 1132-1 to 1132-4 are wires for the transmission signal of the four lanes, whereas the wires 1132-5 to 1132-8 are wires for the reception signal of these lanes.

The lane processing circuit 1124 and the interface circuit 1115 are connected by a wire 1133-1, a wire 1133-2, a wire 1133-5, and a wire 1133-6. The lane processing circuit 1124 and the interface circuit 1116 are connected by a wire 1133-3, a wire 1133-4, a wire 1133-7, and a wire 1133-8. The wires 1133-1 to 1133-4 are wires for the transmission signal of the four lanes, whereas the wires 1133-5 to 1133-8 are wires for the reception signal of these lanes.

The lane processing circuit 1125 and the interface circuit 1115 are connected by a wire 1134-1, a wire 1134-2, a wire 1134-5, and a wire 1134-6. The lane processing circuit 1125 and the interface circuit 1116 are connected by a wire 1134-3, a wire 1134-4, a wire 1134-7, and a wire 1134-8. The wires 1134-1 to 1134-4 are wires for the transmission signal of the four lanes, whereas the wires 1134-5 to 1134-8 are wires for the reception signal of these lanes.

The lane processing circuit 1152 and the interface circuit 1143 of the information processing device 1102 are connected by a wire 1161-1, a wire 1161-2, a wire 1161-5, and a wire 1161-6. The lane processing circuit 1152 and the interface circuit 1144 are connected by a wire 1161-3, a wire 1161-4, a wire 1161-7, and a wire 1161-8. The wires 1161-1 to 1161-4 are wires for the reception signal of the four lanes, whereas the wires 1161-5 to 1161-8 are wires for the transmission signal of these lanes.

The lane processing circuit 1153 and the interface circuit 1143 are connected by a wire 1162-1, a wire 1162-2, a wire 1162-5, and a wire 1162-6. The lane processing circuit 1153 and the interface circuit 1144 are connected by a wire 1162-3, a wire 1162-4, a wire 1162-7, and a wire 1162-8. The wires 1162-1 to 1162-4 are wires for the reception signal of the four lanes, whereas the wires 1162-5 to 1162-8 are wires for the transmission signal of these lanes.

The lane processing circuit 1154 and the interface circuit 1145 are connected by a wire 1163-1, a wire 1163-2, a wire 1163-5, and a wire 1163-6. The lane processing circuit 1154 and the interface circuit 1146 are connected by a wire 1163-3, a wire 1163-4, a wire 1163-7, and a wire 1163-8. The wires 1163-1 to 1163-4 are wires for the reception signal of the four lanes. The wires 1163-5 to 1163-8 are wires for the transmission signal of these lanes.

The lane processing circuit 1155 and the interface circuit 1145 are connected by a wire 1164-1, a wire 1164-2, a wire 1164-5, and a wire 1164-6. The lane processing circuit 1155 and the interface circuit 1146 are connected by a wire 1164-3, a wire 1164-4, a wire 1164-7, and a wire 1164-8. The wires 1164-1 to 1164-4 are wires for the reception signal of the four lanes, whereas the wires 1164-5 to 1164-8 are wires for the transmission signal of these lanes.

Connection relationships among the lane processing circuit 1124, the lane processing circuit 1125, the interface circuit 1115, and the interface circuit 1116, which are illustrated in FIG. 11, are similar to those illustrated in FIG. 9. Also connection relationships among the interface circuit 1145, the interface circuit 1146, the lane processing circuit 1154, and the lane processing circuit 1155 are similar to those illustrated in FIG. 9. Still further, connection relationships among the interface circuit 1115, the interface circuit 1116, the interface circuit 1145, and the interface circuit 1146 are similar to those illustrated in FIG. 9.

An example of the lane control performed by each of the control circuit 1121 and the control circuit 1151, which are illustrated in FIG. 11, is similar to that of FIG. 10. For example, if an all-lane failure of the transmission conversion element or the reception conversion element of the interface circuit 1115 occurs and two lanes of the optical transmission link 1103 enter a disconnected state, the remaining two lanes connected to the normal interface circuit 1116 are selected. Thus, the information processing device 1101 can continue the communication with the information processing device 1102 by using the selected two lanes. In this case, the information processing device 1101 can also continue a communication with the information processing device at the connection destination of the optical transmission link 1104 by using other two lanes connected to the interface circuit 1116.

Alternatively, if the all-lane failure of the transmission conversion element or the reception conversion element of the interface circuit 1113 occurs and two lanes of the optical transmission link 1105 enter a disconnected state, the remaining two lanes connected to the normal interface circuit 1114 are selected. Thus, the information processing device 1101 can continue the communication with the information processing device at the connection destination of the optical transmission link 1105 by using the two selected lanes. In this case, the information processing device 1101 can also continue a communication with the information processing device at the connection destination of the optical transmission link 1106 by using other two lanes connected to the interface circuit 1114.

The configuration of the transceiver system illustrated in FIG. 6, and those of the information processing system illustrated in FIGS. 8, 9 and 11 are merely examples, and some of the components may be omitted or changed according to processes executed by the transceiver system or the information processing system.

For example, in the information processing systems illustrated in FIGS. 8 and 11, the two optical transmission links are connected to each of the interface circuits. However, the number of optical transmission links connected to one interface circuit may be an integer equal to or larger than 2. Moreover, in the information processing systems illustrated in FIGS. 8 and 11, each of the optical transmission links is connected by straddling the two interface circuits. However, each of the optical transmission links may be connected by straddling three or more interface circuits.

The number of lanes included in one optical transmission link is not limited to four, and may be an integer equal to or larger than 2. Also the number of lanes connected to one interface circuit may be an integer equal to or larger than 2.

Additionally, electric transmission links may be used as a replacement for the optical transmission links. When the electric transmission links are used, each interface circuit includes a repeater or a retimer as a replacement for the transmission conversion element and the reception conversion element.

The flowcharts illustrated in FIGS. 7 and 10 are merely examples, and some of the operations may be omitted or changed according to a configuration or a condition of the transceiver system or the information processing system. For example, if the number of normal lanes detected by the information processing device 801 and that of normal lanes detected by the information processing device 802 are always the same in the lane control illustrated in FIG. 11, the operations in steps 1008 and 1009 can be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transceiver system comprising a transmission device and a reception device, wherein:
   the transmission device includes
      a transmission circuit configured to split a transmission signal into a plurality of signals and transmit the plurality of signals to the reception device via a plurality of signal paths included in a communication line between the transmission device and the reception device,
      a first interface circuit connected to the transmission circuit, and also connected to one or more signal paths among the plurality of signal paths,
      a second interface circuit connected to the transmission circuit, and also connected to remaining signal paths except for the one or more signal paths among the plurality of signal paths, and
      a first control circuit configured to change an operation for transmitting the transmission signal via the plurality of signal paths to an operation for transmitting the transmission signal via the remaining signal paths connected to the second interface circuit when the one or more signal paths enter a disconnected state;
   the reception device includes
      a reception circuit configured to receive the plurality of signals from the transmission device via the plurality of signal paths,
      a third interface circuit connected to the reception circuit, and also connected to the one or more signal paths,
      a fourth interface circuit connected to the reception circuit, and also connected to the remaining signal paths, and
      a second control circuit configured to change an operation for receiving the transmission signal via the plurality of signal paths to an operation for receiving the transmission signal via the remaining signal paths connected to the fourth interface circuit when the one or more signal paths enter the disconnected state;
   the transmission circuit includes a demultiplexer configured to transmit the plurality of signals to the plurality of signal paths;
   the first control circuit transmits a first training sequence to the plurality of signal paths, decides the number of signal paths used to transmit the transmission signal based on the number of signal paths that have received a reply to the first training sequence among the plurality of signal paths, and controls the demultiplexer to transmit the transmission signal to the decided number of signal paths among the plurality of signal paths;
   the reception circuit includes a multiplexer configured to receive the plurality of signals from the plurality of signal paths; and
   the second control circuit transmits a second training sequence to the plurality of signal paths, decides the number of signal paths used to receive the transmission signal based on the number of signal paths that have received a reply to the second training sequence among the plurality of signal paths, and controls the multiplexer to receive the transmission signal from the decided number of signal paths among the plurality of signal paths.

2. The transceiver system according to claim 1, wherein
   the transmission circuit transmits another transmission signal different from the transmission signal to another device different from the transmission device and the reception device via a plurality of signal paths included in another communication line different from the communication line,
   the first interface circuit is connected to one or more signal paths among the plurality of signal paths included in the other communication line,
   the second interface circuit is connected to remaining signal paths except for the one or more signal paths among the plurality of signal paths included in the other communication line, and
   the first control circuit changes an operation for transmitting the other transmission signal via the plurality of signal paths included in the other communication line to an operation for transmitting the other transmission signal via the remaining signal paths that are connected to the second interface circuit and included in the other communication line when the one or more signal paths included in the other communication line enter a disconnected state.

3. The transceiver system according to claim 1, wherein
   the reception circuit receives another transmission signal different from the transmission signal from another device different from the transmission device and the reception device via a plurality of signal paths included in another communication line different from the communication line,
   the third interface circuit is connected to one or more signal paths among the plurality of signal paths included in the other communication line, the fourth interface circuit is connected to remaining signal paths except for the one or more signal paths among the plurality of signal paths included in the other communication line, and the second control circuit changes an operation for receiving the other transmission signal via the plurality of signal paths included in the other communication line to an operation for receiving the other transmission signal via the remaining signal paths that are connected to the fourth interface circuit and included in the other communication line when the one or more signal paths included in the other communication line enter a disconnected state.

4. A transceiver system comprising a transmission device and a reception device, wherein:

the transmission device includes a transmission circuit configured to split a transmission signal into a plurality of signals and transmit the plurality of signals to the reception device via a plurality of signal paths included in a communication line between the transmission device and the reception device, a first interface circuit connected to the transmission circuit, and also connected to one or more signal paths among the plurality of signal paths, a second interface circuit connected to the transmission circuit, and also connected to remaining signal paths except for the one or more signal paths among the plurality of signal paths, and a first control circuit configured to change an operation for transmitting the transmission signal via the plurality of signal paths to an operation for transmitting the transmission signal via the remaining signal paths connected to the second interface circuit when the one or more signal paths enter a disconnected state;

the reception device includes a reception circuit configured to receive the plurality of signals from the transmission device via the plurality of signal paths a third interface circuit connected to the reception circuit, and also connected to the one or more signal paths, a fourth interface circuit connected to the reception circuit, and also connected to the remaining signal paths, and a second control circuit configured to change an operation for receiving the transmission signal via the plurality of signal paths to an operation for receiving the transmission signal via the remaining signal paths connected to the fourth interface circuit when the one or more signal paths enter the disconnected state;

wherein the transmission circuit includes a demultiplexer configured to transmit the plurality of signals to the plurality of signal paths and the first control circuit transmits a first training sequence to the plurality of signal paths, decides the number of signal paths used to transmit the transmission signal based on the number of signal paths that have received a reply to the first training sequence among the plurality of signal paths, and controls the demultiplexer to transmit the transmission signal to the decided number of signal paths among the plurality of signal paths;

the reception circuit includes a multiplexer configured to receive the plurality of signals from the plurality of signal paths; and the second control circuit transmits a second training sequence to the plurality of signal paths, decides the number of signal paths used to receive the transmission signal based on the number of signal paths that have received a reply to the second training sequence among the plurality of signal paths, and controls the multiplexer to receive the transmission signal from the decided number of signal paths among the plurality of signal paths.

5. A control method of a transceiver system including a transmission device and a reception device, the control method comprising:

splitting a transmission signal into a plurality of signals by the transmission device;

transmitting, by the transmission device, the plurality of signals to a plurality of signal paths by using a first interface circuit connected to one or more signal paths among the plurality of signal paths included in a communication line between the transmission device and the reception device, and a second interface circuit connected to remaining signal paths except for the one or more signal paths among the plurality of signal paths;

receiving, by the reception device, the plurality of signals from the plurality of signal paths by using a third interface circuit connected to the one or more signal paths, and a fourth interface circuit connected to the remaining signal paths;

transmitting, by the transmission device, a first training sequence to the plurality of signal paths;

deciding the number of signal paths used to transmit the transmission signal based on the number of signal paths that have received a reply to the first training sequence among the plurality of signal paths;

transmitting, by the reception device, a second training sequence to the plurality of signal paths;

deciding the number of signal paths used to receive the transmission signal based on the number of signal paths that have received a reply to the second training sequence among the plurality of signal paths; and controlling the transmission device to change an operation for transmitting the transmission signal to the plurality of signal paths to an operation for transmitting the transmission signal to the decided number of the remaining signal paths among the plurality of signal paths and the reception device to change an operation for receiving the transmission signal from the plurality of signal paths to an operation for receiving the transmission signal from the decided number of the remaining signal paths when the one or more signal paths enter a disconnected state, wherein, the transmission device includes a demultiplexer configured to transmit the plurality of signals to the plurality of signal paths and the reception device includes a multiplexer configured to receive the plurality of signals from the plurality of signal paths.

* * * * *